May 4, 1954     R. W. KAISER     2,677,752
BACKUP LIGHT FOR TRUCKS AND AUTOMOBILES
Filed March 22, 1951
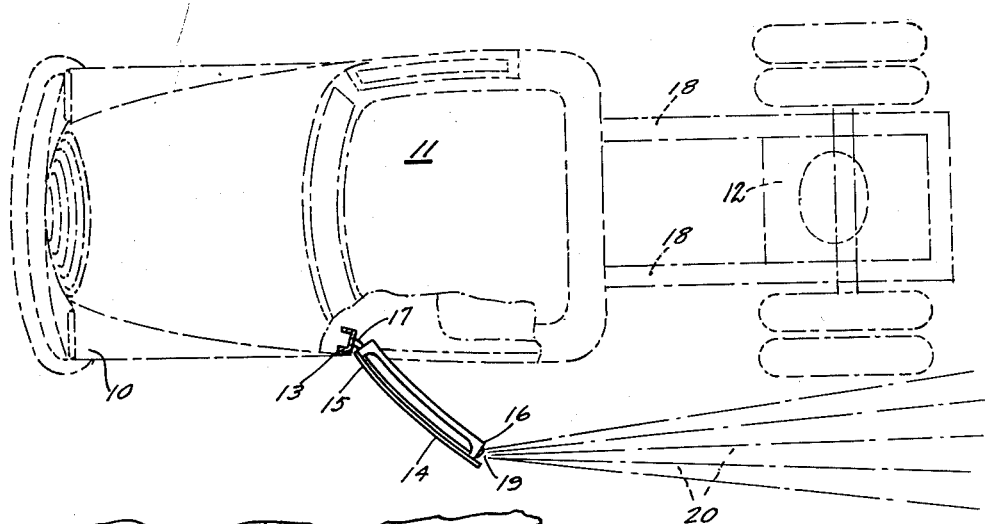
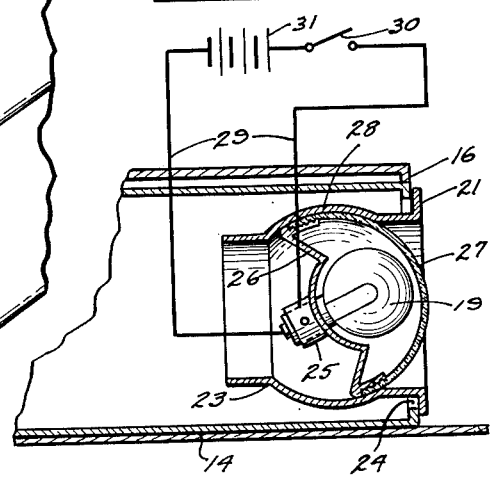
INVENTOR.
Robert W. Kaiser
BY W.B.Harpman
ATTORNEY.

UNITED STATES PATENT OFFICE 2,677,752

BACKUP LIGHT FOR TRUCKS AND AUTOMOBILES

Robert W. Kaiser, near New Middletown, Ohio

Application March 22, 1951, Serial No. 216,915

1 Claim. (Cl. 240—7.1)

This invention relates to a back-up light for trucks and automobiles and more particularly to a back-up light installed in the edge of an access door on the truck or automobile.

The principal object of the invention is the provision of a back-up light suitable for installation in the edge of a truck or automobile door.

A further object of the invention is the provision of the combination of a motor vehicle having a door and a light positioned in one of the edges of the door so that upon the doors being opened, the light is exposed and may be directed rearwardly of the truck or automobile.

A further object of the invention is the provision of a back-up light for installation in the edge of a door of a truck cab or automobile body so that the light is completely recessed within the door and completely hidden from view when the door is in normally closed position in the truck cab or automobile body.

A further object of the invention is the provision of a back-up light for installation in the edge of a door in a truck cab or automobile body, the light including a sleeve-like mounting member and a rotatably positioned light source and reflector enabling the light to be directed as desired with respect to the position of the door.

The back-up light shown and described herein comprises an improvement in the art of back-up lights as heretofore applied to trucks and automobiles in that a light source is disclosed which is advantageously mounted in the rearward or trailing edge of the door on the driver's side of a truck cab or automobile so that upon the doors being opened, the light in the rear edge of the door will be directed rearwardly of the truck or automobile from a point spaced sidewardly with respect to the truck or automobile as occasioned by the opening of the door itself.

The back-up light as disclosed herein is particularly suitable for installation in the rearward edges of truck cab doors as such positioning enables the light to be moved outwardly to a point beyond the truck body or truck trailer body so that the light can be directed rearwardly along side thereof to facilitate a backing operation.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of a truck cab with a portion thereof broken away illustrating a door in partially opened position and a light positioned in the rearward edge of the door.

Figure 2 is an enlarged perspective view of a portion of the door shown in Figure 1 and illustrating the light in the edge thereof.

Figure 3 is a horizontal section on lines 3—3 of Figure 2 and includes a symbolic wiring diagram.

By referring to the drawings and Figure 1 in particular it will be seen that a truck including the cab portion thereof is disclosed, the forward portion of the truck being indicated by the numeral 10, the cab by the numeral 11 and the rear portion of the truck by the numeral 12. A portion of the roof of the cab 11 is shown broken away and one of the front corner posts 13 of the cab body is shown in cross section with a door 14 hingedly affixed thereto and adapted to close the doorway in which it is positioned as is customary.

It will be further observed that the door 14 is on the driver's side of the cab 11 and that it is hinged at its foremost edge 15 so that its rearmost edge 16 moves outwardly from the cab 11 on an arc based on a hinge 17 which affixes the door 14 to the corner posts 13.

Still referring to Figure 1 of the drawings it will be seen that the rearmost portion 12 of the truck includes rearwardly extending frame members 18 which may carry a body directly or a trailer hitching platform, as desired, so that the truck may carry a direct load or be used as a tractor in connection with a trailer as is customary in the art.

It will be observed that the rearward edge 16 of the door 14 has a light source 19 positioned therein with broken lines 20 in Figure 1 indicating a beam of light originated by the light source 19 and illuminating a rearwardly extending path along side the rear portion 12 of the truck.

It will be observed that when the door 14 is swung outwardly by the hinge 17 the light source 19 moves outwardly with respect to the side of the cab 11 so that the presence of a body on a rear portion 12 of the truck will not interfere with the light path as indicated by the lines 20, nor will the presence of a trailer, if and when the same is used in connection with the truck.

The operator of the truck or automobile equipped with the back-up light thus has a relatively freely positioned light to assist in backing up the truck or automobile thus equipped.

By referring now to Figures 2 and 3 of the drawings detailed views of the light source 19 may be seen and in Figure 2 of the drawings, the light source 19 may be seen to be mounted in a mounting plate 21 having apertures through which fasteners 22 are positioned, the mounting plate 21 including a rearwardly extending sleeve-like body 23, as best illustrated in Figure 3, which is adapted to be positioned in an opening 24 formed in the edge 16 of the door as by drilling the same.

The light source 19 comprises an incandescent bulb mounted in a socket 25 in a reflector 26 which in turn is secured at its peripheral edges to a semi-spherical lens 27. The radius of the semi-spherical lens 27 matches a similar radius of aspherical portion 28 formed in the sleeve-like body 23 of the mounting plate 21 and it will be observed that, in assembly, the semi-spherical plastic lens 27 and the reflector 26 form a unit which may be partially rotated in the spherical portion 28 of the sleeve-like body member 23 and that the assembly may be initially positioned in the body member 23 by turning it substantially 90 degrees from the position shown in Figure 3, where it may be moved into the spherical portion of the body member 23 and partially rotated to the position illustrated. In position in the body member and the same secured in the door, as shown in Figure 2, the device may be set by moving the lens 27 as desired so that the beam of light produced by the incandescent bulb, comprising the light source 19, may be directed to suit the individual concerned.

It will further be observed that the entire device is readily positioned in an opening of appropriate size in the rear edge 16 of the door 14 and secured thereto by the fasteners 22. It will be obvious to those skilled in the art that an electrical circuit is established with the incandescent bulb comprising the light source 19 by wires 29 which are connected through a switch 30 with the battery 31 of the truck or automobile in which the device is installed.

It will thus be seen that a back-up light for a truck cab or automobile has been disclosed which enables the operator of the truck or automobile to readily light a path along side of and to the rear of the truck or automobile by merely opening the door adjacent the driver's position and using it to desirably position a light ordinarily hidden in the rear edge of the door.

It will also be observed that, if desired, the switch 30 may be mounted in the post 13 and automatically actuated by the opening of the door 14, as is known in the art, so that the light source 19 will be usable whenever the door is opened.

Having thus described my invention, what I claim is:

A back-up light for installation in the edge of a door of an automotive vehicle and comprising a mounting plate having a flanged sleeve-like body member formed thereon, an annular spherical portion formed in the said sleeve-like body member and a semi-spherical lens rotatably positioned in the sleeve-like body member in registry with the annular spherical portion therein, a reflector having a socket centrally thereof mounted in said semi-spherical lens and an incandescent bulb carried by said reflector and socket and means for establishing electrical connection between said incandescent bulb and a power source.

References Cited in the file of this patent

UNITED STATES PATENTS

| Number | Name | Date |
|---|---|---|
| 1,248,930 | Schulz | Dec. 4, 1917 |
| 2,128,461 | Johnson | Aug. 30, 1938 |
| 2,249,357 | Graham | July 15, 1941 |
| 2,536,799 | Divizia | Jan. 2, 1951 |